(12) United States Patent
Wang

(10) Patent No.: US 9,727,209 B2
(45) Date of Patent: Aug. 8, 2017

(54) HIERARCHICAL DATA STRUCTURE WITH SHORTCUT LIST

(71) Applicant: Yifei Wang, Shanghai (CN)

(72) Inventor: Yifei Wang, Shanghai (CN)

(73) Assignee: SAP SE, Walldorf (DE)

( * ) Notice: Subject to any disclaimer, the term of this patent is extended or adjusted under 35 U.S.C. 154(b) by 268 days.

(21) Appl. No.: 14/225,436

(22) Filed: Mar. 26, 2014

(65) Prior Publication Data

US 2015/0277672 A1   Oct. 1, 2015

(51) Int. Cl.
*G06F 3/048* (2013.01)
*G06F 3/0482* (2013.01)

(52) U.S. Cl.
CPC .................. *G06F 3/0482* (2013.01)

(58) Field of Classification Search
None
See application file for complete search history.

(56) References Cited

U.S. PATENT DOCUMENTS

| | | | | |
|---|---|---|---|---|
| 5,065,347 | A * | 11/1991 | Pajak | G06F 17/30126 715/776 |
| 6,112,024 | A | 8/2000 | Almond et al. | |
| 6,278,991 | B1 | 8/2001 | Ebert | |
| 7,203,701 | B1 * | 4/2007 | Packebush | G06F 17/30961 |
| 7,216,301 | B2 | 5/2007 | Moehrle | |
| 7,340,686 | B2 | 3/2008 | Matthews et al. | |
| 7,584,213 | B2 * | 9/2009 | Liebich | G06F 3/0482 |
| 7,802,203 | B2 | 9/2010 | Danninger | |
| 8,001,487 | B2 * | 8/2011 | Koppert | G06F 3/04855 715/810 |
| 8,490,021 | B2 * | 7/2013 | Emard | G06F 3/0482 715/738 |
| 8,499,256 | B1 * | 7/2013 | Iten | H04N 21/4821 715/810 |
| 2002/0111932 | A1 * | 8/2002 | Roberge | G06F 3/0482 |
| 2003/0061209 | A1 * | 3/2003 | Raboczi | G06F 17/30864 |
| 2005/0091609 | A1 | 4/2005 | Matthews et al. | |
| 2005/0216834 | A1 * | 9/2005 | Gu | G06F 17/2247 715/248 |
| 2007/0150485 | A1 | 6/2007 | Uittenbogaard | |
| 2007/0276846 | A1 * | 11/2007 | Ramanathan | G06Q 10/107 |
| 2007/0288890 | A1 * | 12/2007 | Wells | G06F 8/38 717/113 |
| 2008/0052639 | A1 * | 2/2008 | Chun | G06F 3/0482 715/810 |
| 2008/0141166 | A1 | 6/2008 | Goldberg et al. | |

(Continued)

OTHER PUBLICATIONS

John Harold Pardue et al., Look-ahead and look-behind shortcuts in large item category hierarchies: The impact on search performance, Interacting with Computers, Jun. 2009, pp. 235-242, Elsevier B.V.

*Primary Examiner* — Hua Lu
(74) *Attorney, Agent, or Firm* — Horizon IP PTE Ltd.

(57) ABSTRACT

Described herein is a framework to facilitate visualization. In accordance with one aspect, a visual representation of a hierarchical data structure is presented. The hierarchical data structure includes a plurality of nodes that organize data items. A user selection of a data item associated with a terminal node of the hierarchical data structure may be received. A shortcut of the data item may be inserted into a shortcut list associated with an ancestor node of the terminal node.

19 Claims, 4 Drawing Sheets

(56) References Cited

U.S. PATENT DOCUMENTS

| | | | |
|---|---|---|---|
| 2009/0164522 A1* | 6/2009 | Fahey | H04L 63/30 |
| 2009/0222737 A1* | 9/2009 | Liesche | G06F 17/30873 |
| | | | 715/738 |
| 2009/0307241 A1* | 12/2009 | Schimunek | G06F 17/30091 |
| 2010/0050128 A1 | 2/2010 | Chiang et al. | |
| 2010/0199223 A1* | 8/2010 | Colner | G06F 17/30572 |
| | | | 715/853 |
| 2011/0138339 A1 | 6/2011 | Webster et al. | |
| 2012/0066647 A1 | 3/2012 | Ullmann | |
| 2013/0007671 A1* | 1/2013 | Hammontree | G06F 17/30716 |
| | | | 715/853 |
| 2014/0188946 A1* | 7/2014 | Hartman | G06F 17/30958 |
| | | | 707/805 |

* cited by examiner

HIERARCHICAL DATA STRUCTURE WITH SHORTCUT LIST

TECHNICAL FIELD

The present disclosure relates generally to a hierarchical data structure with a shortcut list.

BACKGROUND

A command menu used in current software products presents a set of functionalities or commands to a user for selection. The user generally controls the software product by navigating to the desired menu command and selecting it for execution. Some applications, such as Enterprise Resource Planning (ERP) software, provide a multitude of commands. To organize such commands, a hierarchical menu structure (e.g., tree-style structure), may be presented.

FIG. 1 shows an exemplary tree-style menu structure 100. The tree-style menu structure 100 may include a root node 102 at the topmost level, internal nodes 104 and 106 at lower levels, and terminal or leaf nodes 108 with no child nodes. Each leaf node 108 represents an executable command, while each internal node 104 and 106 represents a grouping of commands. For large software systems (e.g., SAP ERP Central Component or ECC), there may be so many functionalities such that the menu structure 100 has up to five or more levels. For example, as shown in FIG. 1, the deepest level of leaf nodes 108 is nine. The menu structure 100 represents a total of 200 commands.

With such complex menu structures, it is very difficult for the user or system operator to locate a certain command. It is very inefficient and time-consuming to execute a certain command each time it is desired. The user may have to expand many non-terminal nodes for many levels until the terminal node that represents the desired command is reached. Accordingly, there is a need for an improved framework that addresses these challenges.

SUMMARY

A framework to facilitate visualization is described herein. In accordance with one aspect, a visual representation of a hierarchical data structure is presented. The hierarchical data structure includes a plurality of nodes that organize data items. A user selection of a data item associated with a terminal node of the hierarchical data structure may be received. A shortcut of the data item may be inserted into a shortcut list associated with an ancestor node of the terminal node. An anchor marker may further be presented at a visual representation of the ancestor node to indicate presence of the shortcut list. The anchor marker may be selectable by the user to display or hide the shortcut list.

In accordance with another aspect, a user selection of a command associated with a terminal node of a hierarchical menu structure is received. A usage frequency of the command may be calculated. If the usage frequency exceeds a predetermined threshold value, a menu shortcut of the command may be inserted into at least one shortcut list associated with an ancestor node of the terminal node.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

For purposes of illustration, the present framework is described in the context of hierarchical menu structures that organize commands or functionalities of an application. However, it should be noted that the present framework may also be applied to other hierarchical data structures that store other types of data items, such as directory structures in file managers, content organization for on-line web sites, and so forth.

Figure 1:
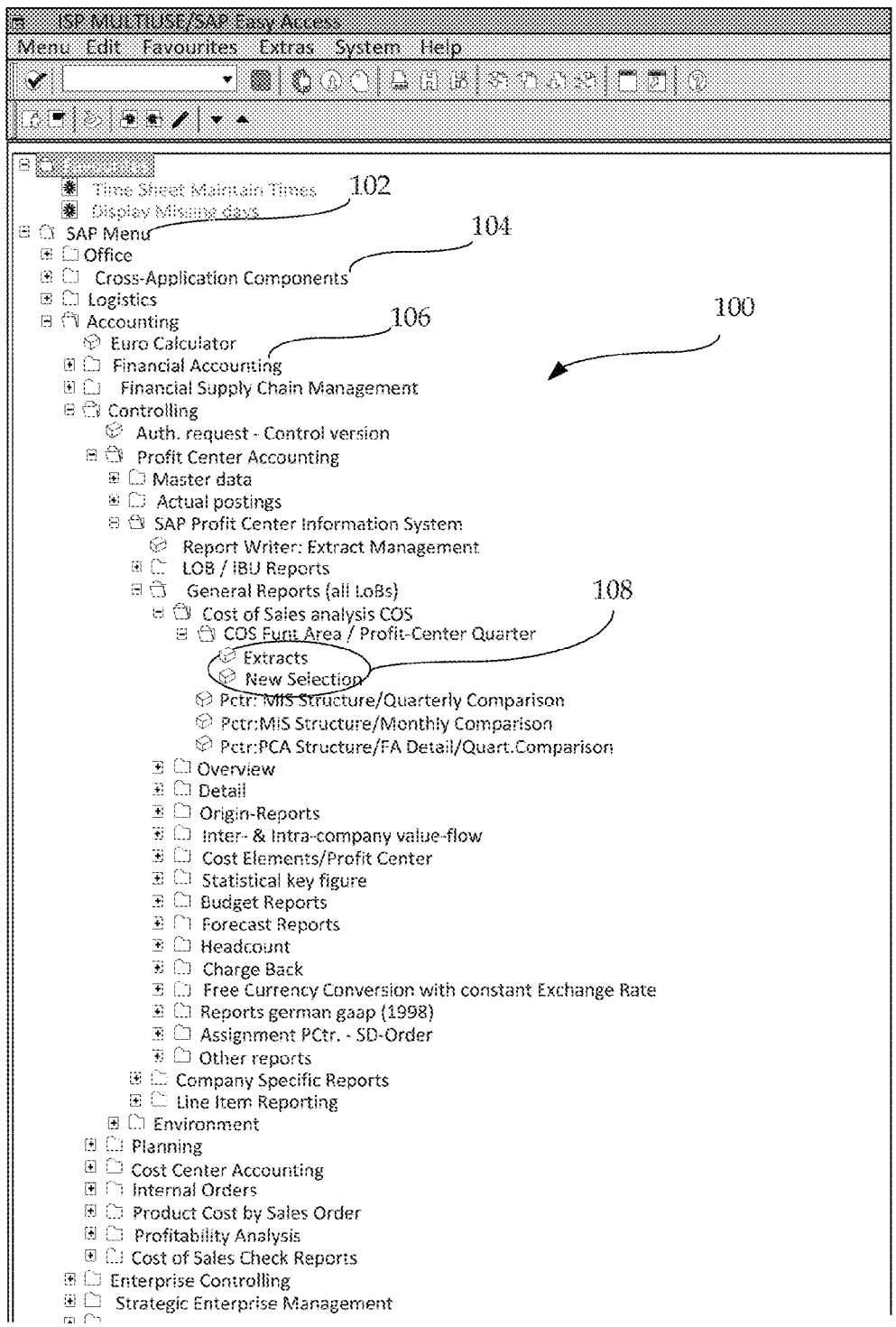
FIG. 1 shows an exemplary tree-style menu structure.
Figure 2:
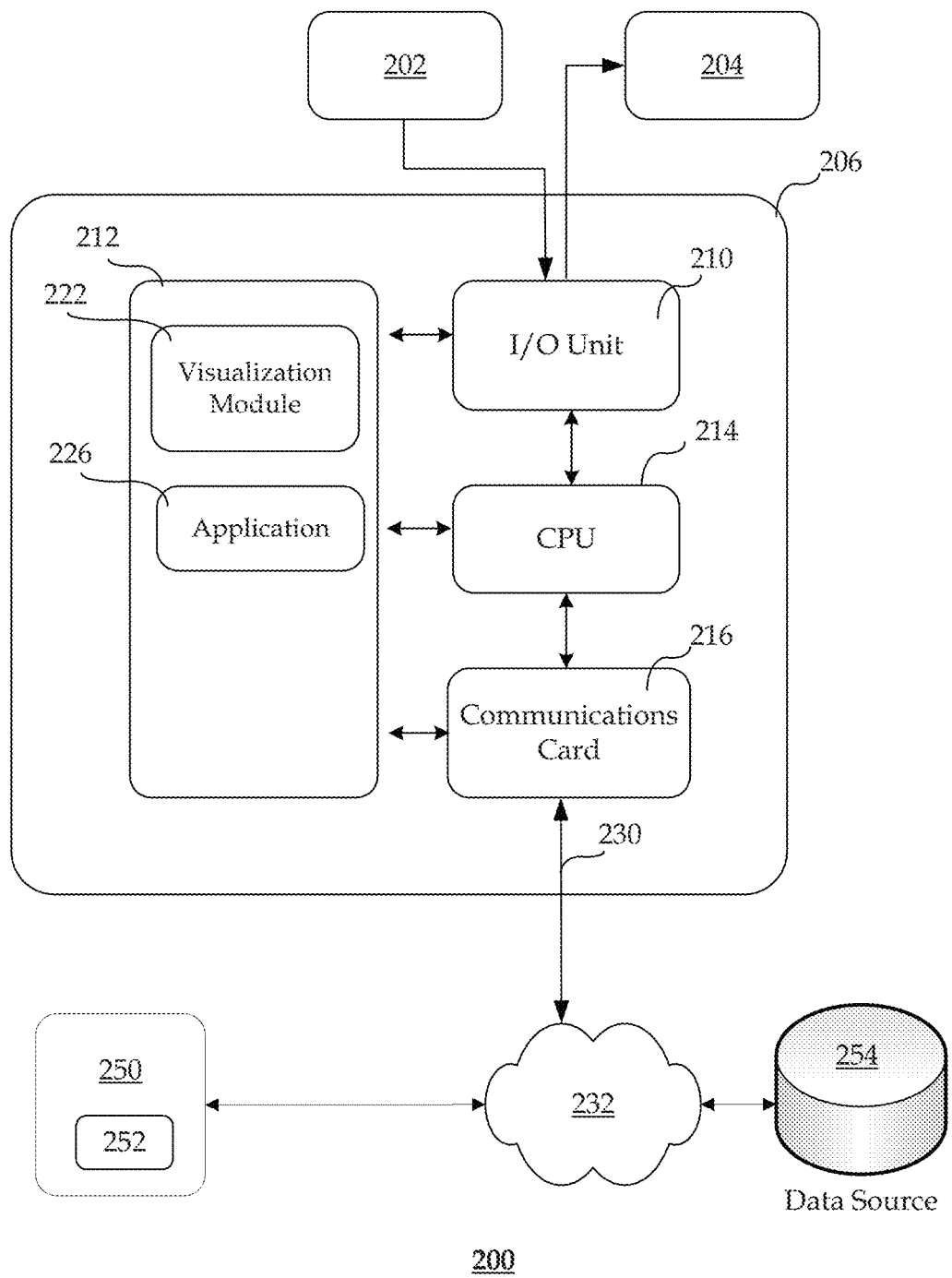
FIG. 2 is a block diagram illustrating an exemplary system.

FIG. 2 is a block diagram illustrating an exemplary environment 200 that may be used to implement the framework described herein. Generally, environment 200 may include a computer system 206 communicatively coupled to an input device 202 (e.g., keyboard, touchpad, microphone, camera, etc.) and an output device 204 (e.g., display device, monitor, printer, speaker, etc.). Computer system 206 also may include a communications card or device 216 (e.g., a modem and/or a network adapter) for exchanging data with network 232 using a communications link 230 (e.g., a telephone line, a wireless network link, a wired network link, or a cable network). Network 232 may be a local area network (LAN) or a wide area network (WAN). The computer system 206 may be communicatively coupled to one or more other computer systems 250 via network 232. For example, the computer system 206 may act as a server and operate in a networked environment using logical connections to one or more client computers 250. Client computers 250 may include components similar to the computer system 206, and may be in the form of a desktop computer, mobile device, tablet computer, communication device, browser-based device, etc. A user at the client computer 250 may interact with a user interface component 252 to communicate with the computer system 206.

The computer system 206 may be communicatively coupled to one or more data sources 254. Data source 254 may be, for example, any database (e.g., relational database, in-memory database, etc.), an entity (e.g., set of related records), or a data set included in a database. Data source 254 may be any suitable data, including a buffer or data that resides in a local volatile memory, and need not directly relate to a database.

It should be appreciated that the different components and sub-components of the computer system 206 may be located on different machines or systems. It should further be appreciated that the components of the client computer 250 may also be located on the computer system 206, or vice versa.

Computer system 206 includes a central processing unit (CPU) or processor 214, an input/output (I/O) unit 210 and a memory module 212. Other support circuits, such as a cache, a power supply, clock circuits and a communications bus, may also be included in computer system 206. In addition, any of the foregoing may be supplemented by, or incorporated in, application-specific integrated circuits. Examples of computer system 206 include a handheld device, a mobile device, a personal digital assistance (PDA), a workstation, a server, a portable laptop computer, another portable device, a mini-computer, a mainframe computer, a storage system, a dedicated digital appliance, a device, a component, other equipments, or some combination of these capable of responding to and executing instructions in a defined manner.

Memory module 212 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 212 serves to store machine-executable instructions, data, and various software components for implementing the techniques described herein, all of which may be processed by CPU 214. As such, the computer system 206 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, the memory module 212 of the computer system 206 includes a visualization module 222 and an application 226. Visualization module 222 may include a set of function modules or programs designed to generate visual representations of hierarchical data structures (e.g., tree menu structures) that organize data items (e.g., commands or functions) provided by application 226. Each hierarchical data structure may include a plurality of nodes that represent data items or groupings of data items. Application 226 may be, for example, an enterprise software application such as an enterprise resource planning (ERP) system, a customer relationship management (CRM) application, a business intelligence application, a business processing management application, or any other type of applications that provides user commands or functions for manipulating the operation of the application. It should be appreciated that the visualization module 222 may be included as part of the application 226, or implemented as standalone component that communicates with the application 226.

Figure 3:
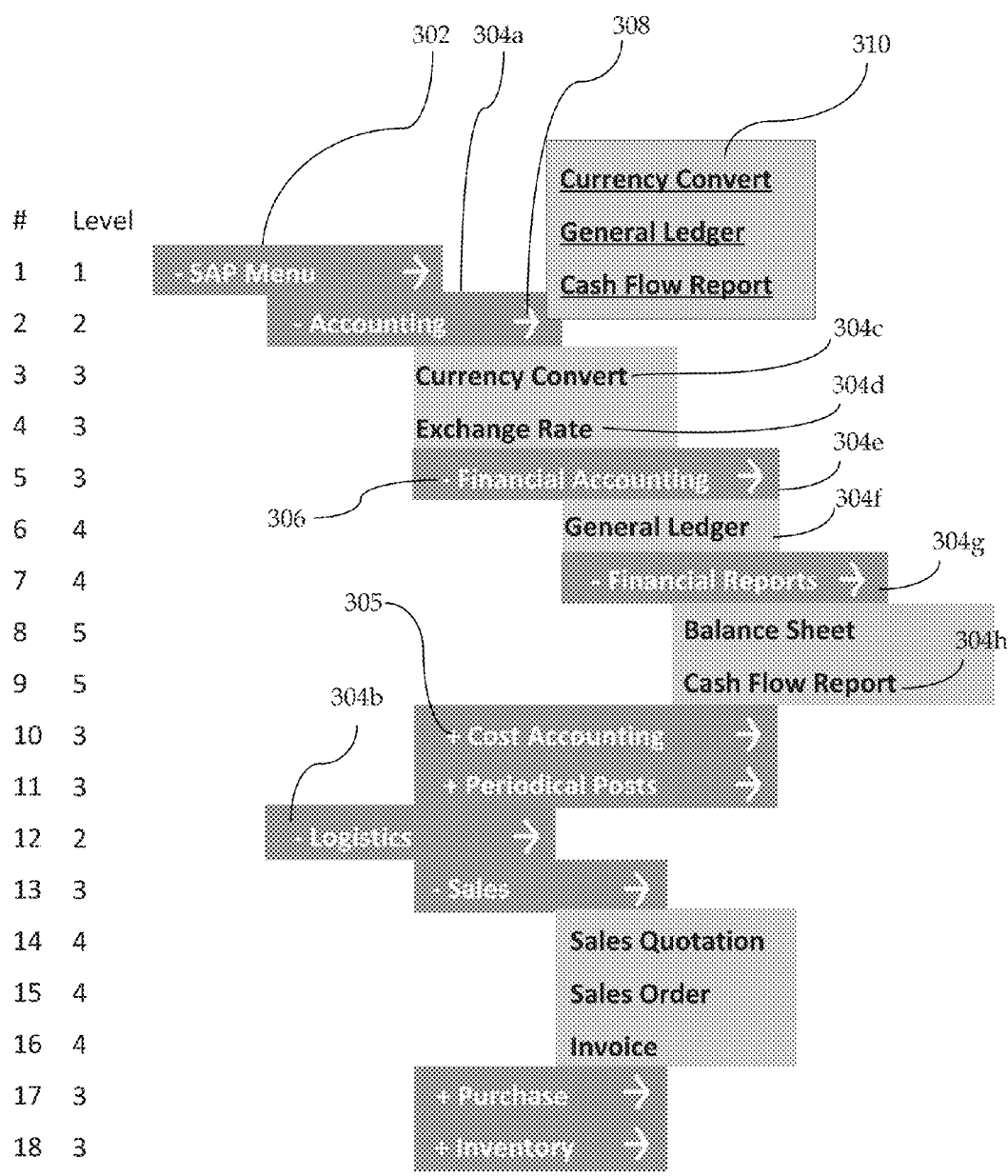
FIG. 3 shows an exemplary visual representation of a hierarchical menu structure.

FIG. 3 shows an exemplary visual representation of a hierarchical menu structure 300. The hierarchical menu structure 300 may be presented via, for example, a user interface component 252. The hierarchical menu structure 300 in this example is presented as an indented list, with each level of indentation corresponding to a hierarchical level of the menu structure. It should be appreciated that other representations of the hierarchical menu structure, such as a graphical tree, may also be used.

As shown, the list starts with a non-indented root node 302 on the first line, followed by indented child nodes 304a-b, each on a separate succeeding line. The non-terminal node 304a is associated with further child nodes 304c-e, which are shown below that node 304a at a next level of indentation. The user may select each non-terminal node to expand or hide the display of associated child nodes. In some implementations, a marker 305 (e.g., + sign) is displayed at the non-terminal node to indicate that it is expandable. Another marker 306 (e.g., − sign) may be displayed at the non-terminal node to indicate that it has already been expanded.

Child nodes 304c-e may be terminal or non-terminal. Terminal (or leaf) nodes 304c-d do not have any further child nodes, while non-terminal node 304e has further child nodes 304f-g. Terminal nodes 304c-d represent commands. The user may select one or more commands for execution by the application 226 by selecting (e.g., double clicking) the respective terminal nodes.

In accordance with some implementations, an anchor marker 308 (e.g., arrow) is presented at one or more non-terminal nodes. The anchor marker 308 indicates that a shortcut list 310 is associated with that particular node. The user may select the anchor marker 308 to display or hide the shortcut list 310. The shortcut list 310 may be displayed as, for example, a pop-up sub-menu. The shortcut list 310 of a node includes one or more menu shortcuts. Selecting a menu shortcut invokes the execution of the corresponding command it links to. The menu shortcuts in a shortcut list may be sorted according to, for example, usage frequency, time of entry, level of importance, etc. In addition, the shortcut list may be limited to include a pre-determined number of menu shortcuts (e.g., top 5 most frequently used command menu shortcuts).

Each menu shortcut on the shortcut list 310 of a node is linked to a command of the node's descendent terminal node. For example, as shown in FIG. 3, the shortcut list 310 associated with the "Accounting" node 304a contains menu shortcuts to commands "Currency Convert" (line 3), "General Ledger" (line 6), and "Cash Flow Report" (line 9), which are all associated with descendent terminal nodes (304c, 304f, 304h) of the "Accounting" node 308. The shortcut list associated with the "SAP Menu" root node 302 may include menu shortcuts to more commands (e.g., any command under the "Accounting" and "Logistics" nodes 304a, 304b), while the shortcut list associated with the lower level "Financial Accounting" node 304e may only include menu shortcuts to the "General Ledger" command of node 304f and/or any command under the "Financial Reports" node 304g.

Figure 4:
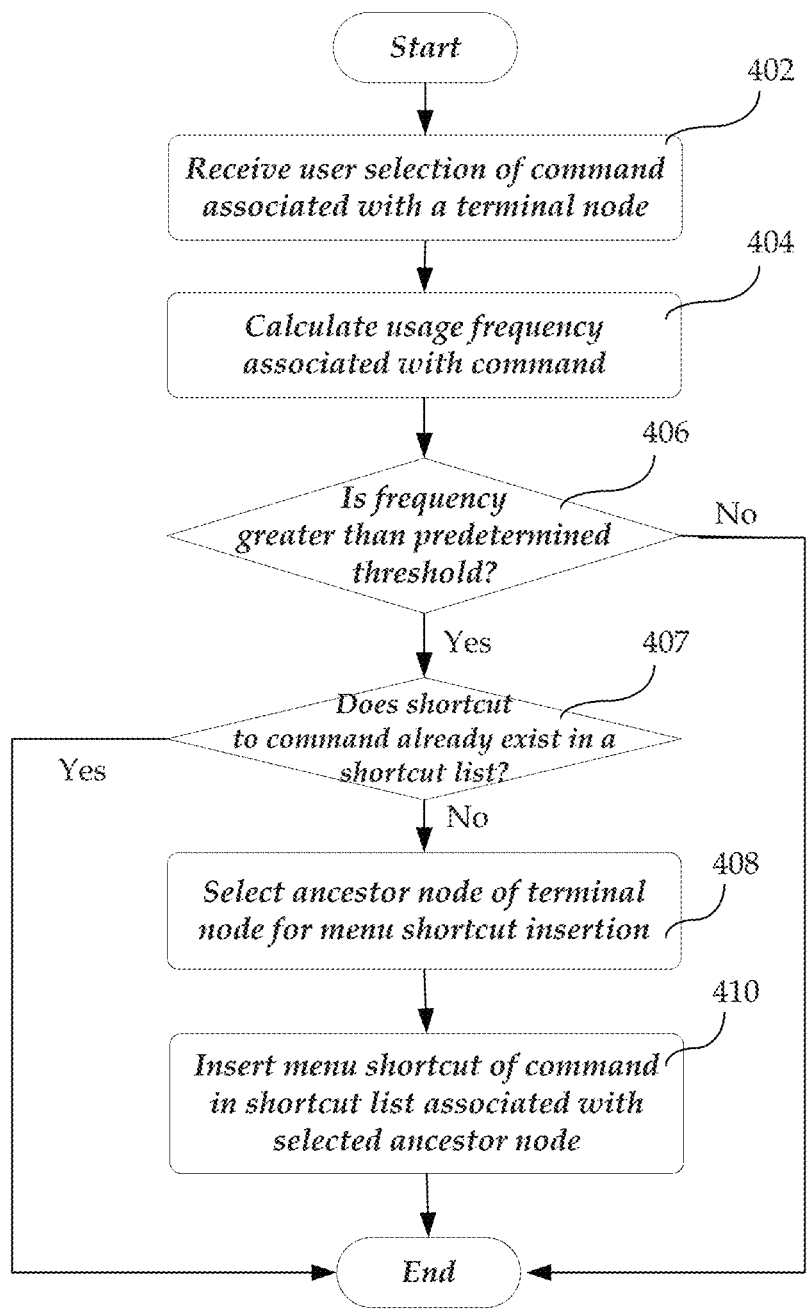
FIG. 4 shows an exemplary method of generating a menu shortcut list.

FIG. 4 shows an exemplary method 400 of generating a menu shortcut list. The method 400 may be performed automatically or semi-automatically by the system 200, as previously described with reference to FIG. 2. It should be noted that in the following discussion, reference will be made, using like numerals, to the features described in FIG. 2.

At 402, visualization module 222 receives a user selection of a command associated with a terminal node of a hierarchical menu structure. The user may select the command for execution by application 226 via, for example, a hierarchical menu structure visualization presented at a user interface 252. The hierarchical menu structure visualization may be presented as an indented list, such as shown in FIG. 3.

At 404, visualization module 222 calculates a usage frequency associated with the selected command. The usage frequency may indicate the number of times the command has been selected for execution by the user. Each time the command (or its corresponding terminal node) is selected, the corresponding usage frequency may be incremented.

At 406, visualization module 222 determines if the usage frequency exceeds a predetermined threshold value. The predetermined threshold value may be defined by the user or the system. If the usage frequency does not exceed a predetermined threshold value, the method 400 ends.

If the frequency is greater than a predetermined threshold value, at 407, visualization module 222 determines if a menu shortcut to the selected command already exists on a shortcut list. Such shortcut list may be associated with any ancestor node of the terminal node. If the menu shortcut already exists, the method 400 ends without automatically adding any new menu shortcut.

If the menu shortcut cannot be found on any shortcut list, at 408, visualization module 222 automatically selects an ancestor node of the terminal node to which the menu shortcut may be automatically inserted. For each non-terminal node, the user may indicate whether a menu shortcut may be automatically inserted to its shortcut list, or whether the shortcut list can only be manually updated by the user. The user may also define or select the rule of automatic menu shortcut insertion of menu shortcuts. Alternatively, these settings may be pre-defined by the system 206.

In some implementations, the menu shortcut is automatically inserted into shortcut lists associated with all ancestor nodes of the terminal node. In such cases, all the ancestor nodes of the terminal node are selected for menu shortcut insertion. Alternatively, a top-down rule or a bottom-up method may be used to select an ancestor node for menu shortcut insertion. The selected ancestor node satisfies one or more pre-defined conditions for automatic menu shortcut insertion. Exemplary pre-defined conditions include (1) automatic insertion is enabled for that node; and (2) number of menu shortcuts on its shortcut list has not reached a predetermined limit, which can be defined by the user or system. Other types of pre-defined conditions are also useful.

According to an exemplary top-down selection method, visualization module 222 checks ancestor nodes from the top level of the hierarchical menu structure downwards and selects the first ancestor node that satisfies the pre-defined conditions. More particularly, visualization module 222 may first check the root node (at top level) to determine if the pre-defined conditions are satisfied for automatic insertion. If all the pre-defined conditions are satisfied, visualization module 222 selects the root node for menu shortcut insertion and the method 400 proceeds to 410.

If any of the pre-defined conditions is not satisfied, visualization module 222 may proceed to the next lower level of the hierarchical menu structure to check one of the root node's children that is also an ancestor node of the terminal node to determine if the pre-defined conditions are satisfied. The checking may be recursively repeated for lower level nodes until an ancestor node is found that fulfils all the pre-defined conditions. Such ancestor node is selected for menu shortcut insertion and the method 400 proceeds to 410. If the terminal node is reached without finding such ancestor node, the method 400 terminates without automatically adding any new menu shortcut.

According to an exemplary bottom-up selection method, visualization module 222 checks ancestor nodes from the bottom level of the hierarchical menu structure upwards and selects the first ancestor node that satisfies the pre-defined conditions. More particularly, visualization module 222 may first check the direct parent node of the terminal node (at bottom level) to determine if the pre-defined conditions are satisfied for automatic insertion. If all the pre-defined conditions are satisfied, visualization module 222 selects the parent node for menu shortcut insertion and the method 400 proceeds to 410.

If any of the pre-defined conditions is not satisfied, visualization module 222 may proceed to the next upper level of the hierarchical menu structure to check the parent node's direct parent node that is also an ancestor node of the terminal node to determine if the pre-conditions are satisfied. The checking may be recursively repeated for higher level nodes until an ancestor node is found that fulfils all the pre-defined conditions. Such ancestor node is selected for menu shortcut insertion and the method 400 proceeds to 410. If the root node is reached without finding such ancestor node, the method 400 terminates without automatically adding any new menu shortcut.

At 410, visualization module 222 automatically inserts a corresponding menu shortcut of the command to at least one shortcut list associated with the selected ancestor node. An anchor marker is presented at the corresponding ancestor node representation to indicate the presence of the shortcut list.

Additionally, or alternatively, the user may create, delete, edit and/or customize the shortcut list. In some implementations, the user may insert a menu shortcut to a shortcut list associated with a particular non-terminal node by selecting the command from the corresponding terminal node, and dragging and dropping the command onto the non-terminal node or the anchor marker corresponding to the shortcut list.

In some implementations, the user may manually insert the menu shortcut by entering a string of characters into a field of the shortcut list by using, for example, a keypad, touchpad, or any other user input device. The characters may designate at least part of the name of the command to which the menu shortcut links. Suggestions of matching commands may be provided while the user inputs the characters. For example, an ad-hoc list containing suggestions of commands that match the user's input may be provided, and the user may select one of the commands from the list as the new command to insert into the shortcut list.

The user may also remove a particular menu shortcut from a shortcut list by initiating a delete operation on the menu shortcut, such as "right-clicking" on the menu shortcut and selecting "delete" on a context menu pop-up, or dragging and dropping the menu shortcut away from the shortcut list. In addition, the user may also sort or arrange the menu shortcuts on the shortcut list by, for instance, "right-clicking" on the menu shortcut and selecting "sort" on a context menu pop-up, or by performing a "drag and drop" operation to re-order the menu shortcuts.

The shortcut lists may also be pre-customized by the administrator or developer of the application 226. This may be useful, for example, in providing guidance to a new user of the application 226 in using the application 226. The shortcut lists may be pre-customized to include, for example, the most commonly used or most important functions for a particular role or functional area.

Menu shortcut lists advantageously enable quick access, convenience and information about particular functional areas. They can be used to, for example, provide information to the user about the most important or frequently used functions in a particular business functional area (e.g., accounting). Menu shortcuts linking to more important or frequently used commands may be located at higher levels to allow the user to access them with fewer clicks to expand the hierarchical menu structure. For better user experience, it may not be suitable to provide shortcut lists with too many menu shortcuts, so menu shortcuts to less important commands may be positioned at lower levels. However, no matter which level the shortcut list is placed at, it can always contain shortcuts to the most important commands at the corresponding level.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of generating a menu shortcut list, comprising:
presenting, via a user interface component, a visual representation of a hierarchical menu structure having a plurality of nodes that organize commands executable by an enterprise software application, wherein the visual representation comprises an indented list of multiple lines, wherein the multiple lines represent different nodes of the hierarchical menu structure, and each level of indentation of the indented list corresponds to a hierarchical level of the hierarchical menu structure;
receiving, by a computer system, a user selection of a command for execution, wherein the command is associated with a terminal node of the hierarchical menu structure;
calculating, by the computer system, a usage frequency of the command;
in response to the usage frequency exceeding a predetermined threshold value, recursively searching, by the computer system, for at least one ancestor node of the terminal node that fulfills one or more pre-defined conditions; and
automatically inserting, by the computer system, a menu shortcut of the command to a shortcut list associated with the one or more ancestor nodes, wherein the shortcut list is displayable as a pop-up sub-menu at a line corresponding to the one or more ancestor nodes in the visual representation.

2. The method of claim 1 wherein recursively searching for the at least one ancestor node of the terminal node comprises finding all ancestor nodes of the terminal node.

3. The method of claim 1 wherein recursively searching for the at least one ancestor node of the terminal node comprises performing a top-down selection method.

4. The method of claim 1 wherein recursively searching for the at least one ancestor node of the terminal node comprises performing a bottom-up selection method.

5. The method of claim 1 further comprising presenting an anchor marker at the one or more ancestor nodes to indicate presence of the shortcut list, wherein the anchor marker is selectable by the user to display or hide the shortcut list.

6. A method of visualization, comprising:
presenting, via a user interface component, a visual representation of a hierarchical menu structure having a plurality of nodes that organize commands executable by an enterprise software application, wherein the visual representation comprises an indented list of multiple lines, wherein the multiple lines represent different nodes of the hierarchical menu structure, and each level of indentation of the indented list corresponds to a hierarchical level of the hierarchical menu structure;
receiving, at a computer system, a user selection of a command associated with a terminal node of the hierarchical menu structure;
recursively searching, by the computer system, for at least one ancestor node of the terminal node that fulfills one or more pre-defined conditions;
inserting, by the computer system, a shortcut of the command into a shortcut list associated with the one or more ancestor nodes of the terminal node; and
presenting, via the user interface component, an anchor marker at a visual representation of the one or more ancestor nodes to indicate presence of the shortcut list, wherein the anchor marker is selectable by the user to display or hide the shortcut list, wherein the shortcut list is displayable as a pop-up sub-menu at a line corresponding to the one or more ancestor nodes in the visual representation.

7. The method of claim 6 further comprising:
determining a usage frequency of the command; and
if the usage frequency of the command is greater than a predetermined threshold, automatically inserting the shortcut of the command into the shortcut list associated with the one or more ancestor nodes of the terminal node.

8. The method of claim 7 wherein recursively searching for the at least one ancestor node comprises using a top-down selection method.

9. The method of claim 7 wherein recursively searching for the at least one ancestor node comprises using a bottom-up selection method.

10. The method of claim 7 wherein automatically inserting the shortcut of the command comprises automatically inserting the shortcut of the command into shortcut lists associated with all ancestor nodes of the terminal node.

11. The method of claim 7 further comprising sorting the shortcut list according to usage frequencies of commands in the shortcut list.

12. The method of claim 6 wherein inserting the shortcut of the command comprises inserting the shortcut of the command into the shortcut list in response to a drag and drop operation.

13. The method of claim 6 wherein receiving the user selection of the command comprises receiving the user selection in response to the user entering a string of characters into a field of the shortcut list.

14. The method of claim 6 further comprising removing the command from the shortcut list in response to a delete operation initiated by the user.

15. A non-transitory computer-readable medium having stored thereon program code, the program code executable by a computer to:
present a visual representation of a hierarchical menu structure having a plurality of nodes that organize commands executable by an enterprise software application, wherein the visual representation comprises an indented list of multiple lines, wherein the multiple lines represent different nodes of the hierarchical menu structure, and each level of indentation of the indented list corresponds to a hierarchical level of the hierarchical menu structure;

receive a user selection of a command associated with a terminal node of the hierarchical menu structure;

recursively search for at least one ancestor node of the terminal node that fulfills one or more pre-defined conditions; and insert a shortcut of the command into a shortcut list associated with the one or more ancestor nodes of the terminal node, wherein the shortcut list is displayable as a pop-up sub-menu at a line corresponding to the one or more ancestor nodes in the visual representation.

16. A system comprising:

a non-transitory memory device for storing computer-readable program code; and a processor in communication with the memory device, the processor being operative with the computer-readable program code to present a visual representation of a hierarchical menu structure having a plurality of nodes that organize commands executable by an enterprise software application, wherein the visual representation comprises an indented list of multiple lines, wherein the multiple lines represent different nodes of the hierarchical menu structure, and each level of indentation of the indented list corresponds to a hierarchical level of the hierarchical menu structure, receive a user selection of a command associated with a terminal node of the hierarchical menu structure, recursively search for at least one ancestor node of the terminal node that fulfills one or more pre-defined conditions, wherein the one or more pre-defined conditions comprise at least "automatic insertion is enabled", and insert a shortcut of the command into a shortcut list associated with the one or more ancestor nodes of the terminal node, wherein the shortcut list is displayable as a pop-up sub-menu at a line corresponding to the one or more ancestor nodes in the visual representation.

17. The system of claim 16, wherein the processor is further operative with the computer-readable program code to present an anchor marker at a visual representation of the one or more ancestor nodes to indicate presence of the shortcut list, wherein the anchor marker is selectable by the user to display or hide the shortcut list.

18. The system of claim 17, wherein the processor is further operative with the computer-readable program code to determine a usage frequency of the command; and if the usage frequency of the command is greater than a predetermined threshold, automatically insert the shortcut of the command to the shortcut list associated with the one or more ancestor nodes of the terminal node.

19. The system of claim 16 wherein the one or more pre-defined conditions further comprise "number of menu shortcuts on the shortcut list has not reached a predetermined limit".

* * * * *